(12) United States Patent
Sakai et al.

(10) Patent No.: US 8,649,193 B2
(45) Date of Patent: Feb. 11, 2014

(54) LEAKAGE CURRENT REDUCING APPARATUS

(75) Inventors: Takuya Sakai, Tokyo (JP); Satoshi Azuma, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/636,209

(22) PCT Filed: Apr. 1, 2011

(86) PCT No.: PCT/JP2011/058441
§ 371 (c)(1),
(2), (4) Date: Sep. 20, 2012

(87) PCT Pub. No.: WO2011/125944
PCT Pub. Date: Oct. 13, 2011

(65) Prior Publication Data
US 2013/0010506 A1    Jan. 10, 2013

(30) Foreign Application Priority Data
Apr. 5, 2010 (JP) .................................. 2010-087125

(51) Int. Cl.
*H02M 1/12* (2006.01)
*H02M 1/16* (2006.01)

(52) U.S. Cl.
USPC .................. 363/39; 363/40; 363/44; 323/206

(58) Field of Classification Search
USPC ............. 363/37, 39–48, 90–98; 323/205, 206
See application file for complete search history.

(56) References Cited

U.S. PATENT DOCUMENTS

| | | | |
|---|---|---|---|
| 5,831,842 A | 11/1998 | Ogasawara et al. | |
| 6,388,451 B1 * | 5/2002 | Burba et al. ................... | 324/522 |
| 6,667,685 B2 * | 12/2003 | Wasaki et al. ................. | 375/285 |
| 2006/0161148 A1 * | 7/2006 | Behnke .......................... | 606/34 |
| 2011/0317455 A1 | 12/2011 | Azuma et al. | |
| 2013/0147419 A1 * | 6/2013 | Sakai et al. ................... | 318/722 |

FOREIGN PATENT DOCUMENTS

| | | |
|---|---|---|
| JP | 62 25827 | 2/1987 |
| JP | 9 215341 | 8/1997 |
| JP | 9 266677 | 10/1997 |

(Continued)

OTHER PUBLICATIONS

International Search Report Issued Jul. 5, 2011 in PCT/JP11/58441 Filed Apr. 1, 2011.

*Primary Examiner* — Jessica Han
(74) *Attorney, Agent, or Firm* — Oblon, Spivak, McClelland, Maier & Neustadt, L.L.P.

(57) ABSTRACT

First windings of a first common mode transformer and second windings of a second common mode transformer are connected in series via connection lines. The windings are connected to an AC power supply via connection lines. The first windings are connected to a three-phase motor via connection lines, a converter, and an inverter. High-frequency leakage currents flowing in the connection lines are detected as a common mode voltage by a winding for common mode voltage detection. An output voltage is inputted via a filter to a voltage amplifier unit that amplifies the output voltage, and the amplified voltage is applied to a winding via a capacitor in substantially a same direction as a direction of the common mode voltage. As a result, leakage currents are reduced by induced voltages on the windings.

12 Claims, 10 Drawing Sheets

(56) References Cited

FOREIGN PATENT DOCUMENTS

| | | |
|---|---|---|
| JP | 10 94244 | 4/1998 |
| JP | 2003 87973 | 3/2003 |
| JP | 2004 357447 | 12/2004 |
| JP | 2006 136058 | 5/2006 |
| JP | 2010 57268 | 3/2010 |
| WO | 2010 100934 | 9/2010 |

* cited by examiner

LEAKAGE CURRENT REDUCING APPARATUS

TECHNICAL FIELD

The present invention relates to a leakage current reducing apparatus which reduces a leakage current occurring in, for example, a power conversion apparatus or the like which is connected to an AC power supply and outputs a given AC voltage.

BACKGROUND ART

As an example of conventional leakage current reducing apparatus, the following high-frequency leakage current reducing apparatus is known. That is, in order to reduce a high-frequency leakage current occurring in three-phase power supply lines connected between an inverter apparatus and a three-phase motor, the high-frequency leakage current reducing apparatus comprises: a current detection coil for detecting the high-frequency leakage current; high-frequency amplification means for amplifying the detected high-frequency leakage current; and a matching coil for electromagnetically injecting the amplified high-frequency leakage current, in the opposite phase, to the three-phase power supply lines (for example, see Patent Document 1).

CITATION LIST

Patent Literature

Patent Document 1: Japanese Laid-Open Patent Publication No. 09-215341 (Paragraph [0015] and FIG. 1)

SUMMARY OF THE INVENTION

Problems to be Solved by the Invention

In the conventional high-frequency leakage current reducing apparatus, a high-frequency leakage current in a common mode is detected by a current detection coil. The high-frequency leakage current detected by the current detection coil is supplied to a high-frequency amplifier, which amplifies the power of the high-frequency leakage current. However, owing to delay times of the high-frequency amplifier and a detection circuit, the phase of the current supplied to a matching coil inverts from the phase of the high-frequency leakage current. As a result, the high-frequency leakage current supplied from the inverter apparatus is amplified. In addition, the high-frequency amplifier causes resonance owing to the impedances of a line and an apparatus connected to the line, the inductances of the matching coil and the current detection coil, and the like. As a result, unnecessary power is supplied to a system, or the high-frequency leakage current is amplified. Thus, there is a problem that the effect of reducing a noise current in the common mode cannot be expected.

In addition, after the high-frequency leakage current in the common mode is amplified, the amplified current is electromagnetically injected, in the opposite phase, to the three-phase power supply lines via the matching coil. Thus, when the injected opposite-phase current is equal to the high-frequency leakage current having a zero phase, the high-frequency leakage current can be reduced to zero because both currents cancel each other. That is, when the amplitude and the phase of the injected current have desired values, the high-frequency leakage current becomes zero. However, actually, owing to variations in the components, temperature change, and the like, there is a problem that the noise reduction effect cannot be sufficiently obtained. In addition, if a control circuit for cancelling such influences is connected, there is a problem that the number of components increases and the circuit configuration is complicated.

Moreover, in the case where the high-frequency leakage current reducing apparatus is installed on the three-phase power supply lines between the inverter apparatus and the three-phase motor, the power supply side which supplies energy to the inverter apparatus is not taken into consideration. For example, in the case where the power supply is an AC power supply and the AC power is converted to DC power to supply energy to the inverter apparatus, there is a problem that a measure for reducing the high-frequency leakage current occurring in a rectification circuit for converting the AC power to DC power is not taken into consideration.

The present invention has been made to solve the above problems. An object of the present invention is to provide a leakage current reducing apparatus with a simple configuration, capable of reducing a leakage current and performing a stable operation.

Solution to the Problems

A leakage current reducing apparatus according to the present invention comprises: voltage detection means; an input-side filter; a voltage amplifier unit; and voltage application means, the leakage current reducing apparatus being provided, via a connection line, between a first electric apparatus and a second electric apparatus. The voltage detection means comprises a main winding, and a winding for leakage current detection. The main winding is provided, via the connection line, between the first electric apparatus and the second electric apparatus, so that a leakage current flowing in the connection line is detected, as a detected voltage, by the winding for leakage current detection. The detected voltage is inputted to the input-side filter. The voltage amplifier unit amplifies a voltage outputted from the input-side filter, and outputs the amplified voltage as an output voltage. The voltage application means generates, on the connection line, an application voltage for reducing the leakage current, based on the output voltage.

Effect of the Invention

The leakage current reducing apparatus according to the present invention comprises: voltage detection means; an input-side filter; a voltage amplifier unit; and voltage application means, the leakage current reducing apparatus being provided, via a connection line, between a first electric apparatus and a second electric apparatus. The voltage detection means comprises a main winding, and a winding for leakage current detection. The main winding is provided, via the connection line, between the first electric apparatus and the second electric apparatus, so that a leakage current flowing in the connection line is detected, as a detected voltage, by the winding for leakage current detection. The detected voltage is inputted to the input-side filter. The voltage amplifier unit amplifies a voltage outputted from the input-side filter, and outputs the amplified voltage as an output voltage. The voltage application means generates, on the connection line, an application voltage for reducing the leakage current, based on the output voltage. Therefore, it is possible to provide a leakage current reducing apparatus with a simple configuration, capable of reducing a leakage current and performing a stable operation.

BEST MODE FOR CARRYING OUT THE INVENTION

Embodiment 1

Figure 1:
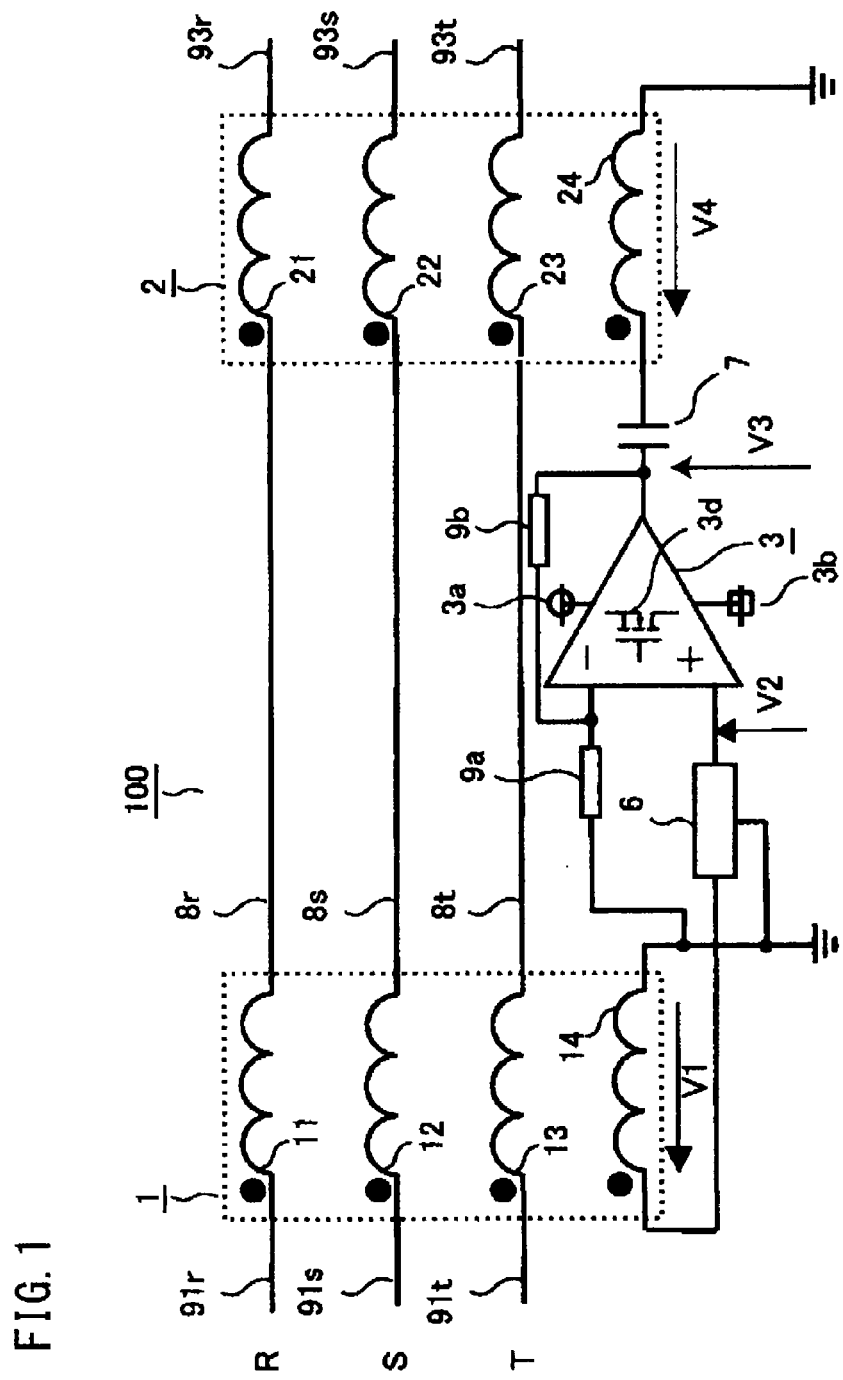
FIG. 1 is a configuration diagram showing a high-frequency leakage current reducing apparatus according to embodiment 1 of the present invention.
Figure 2:
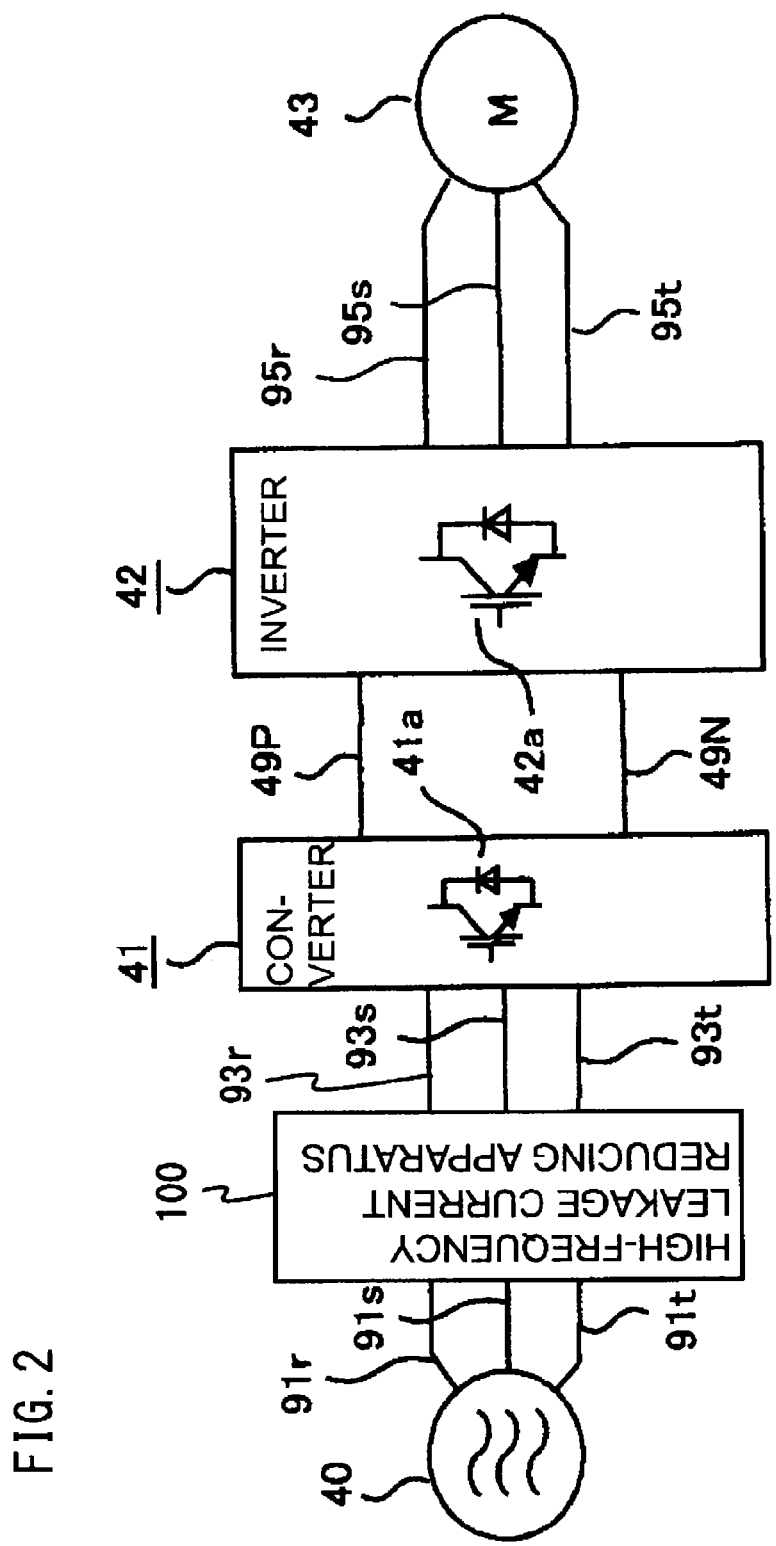
FIG. 2 is a connection diagram showing a connection example of the high-frequency leakage current reducing apparatus according to embodiment 1.
Figure 3:
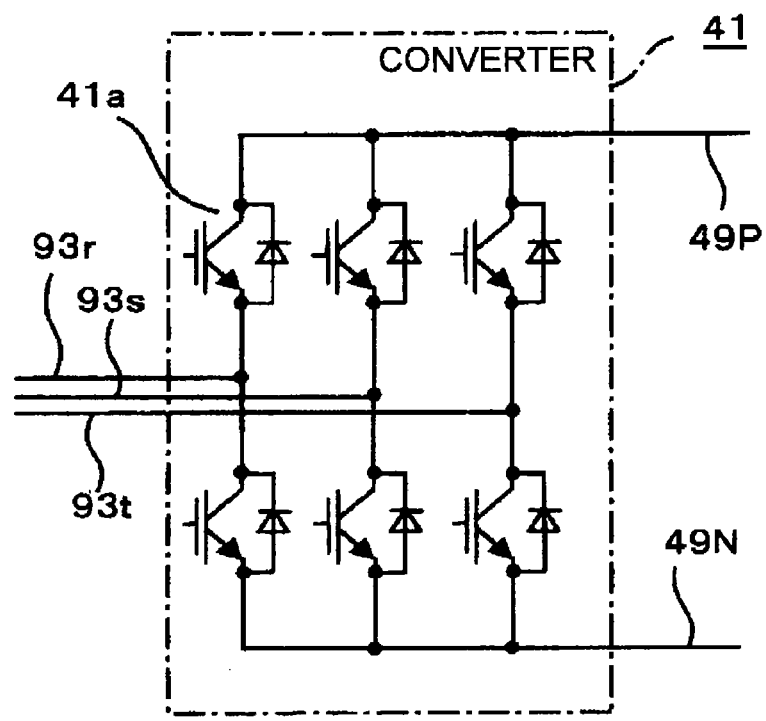
FIG. 3 is a circuit diagram showing the detailed configuration of a converter shown in FIG. 2.
Figure 4:
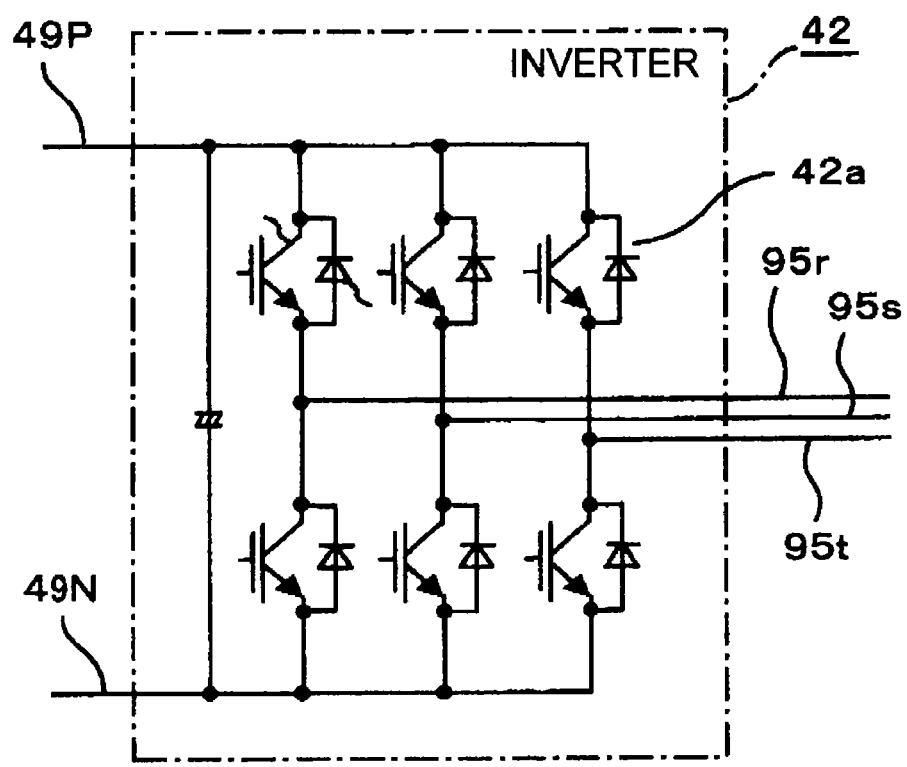
FIG. 4 is a circuit diagram showing the detailed configuration of an inverter shown in FIG. 2.
Figure 5:
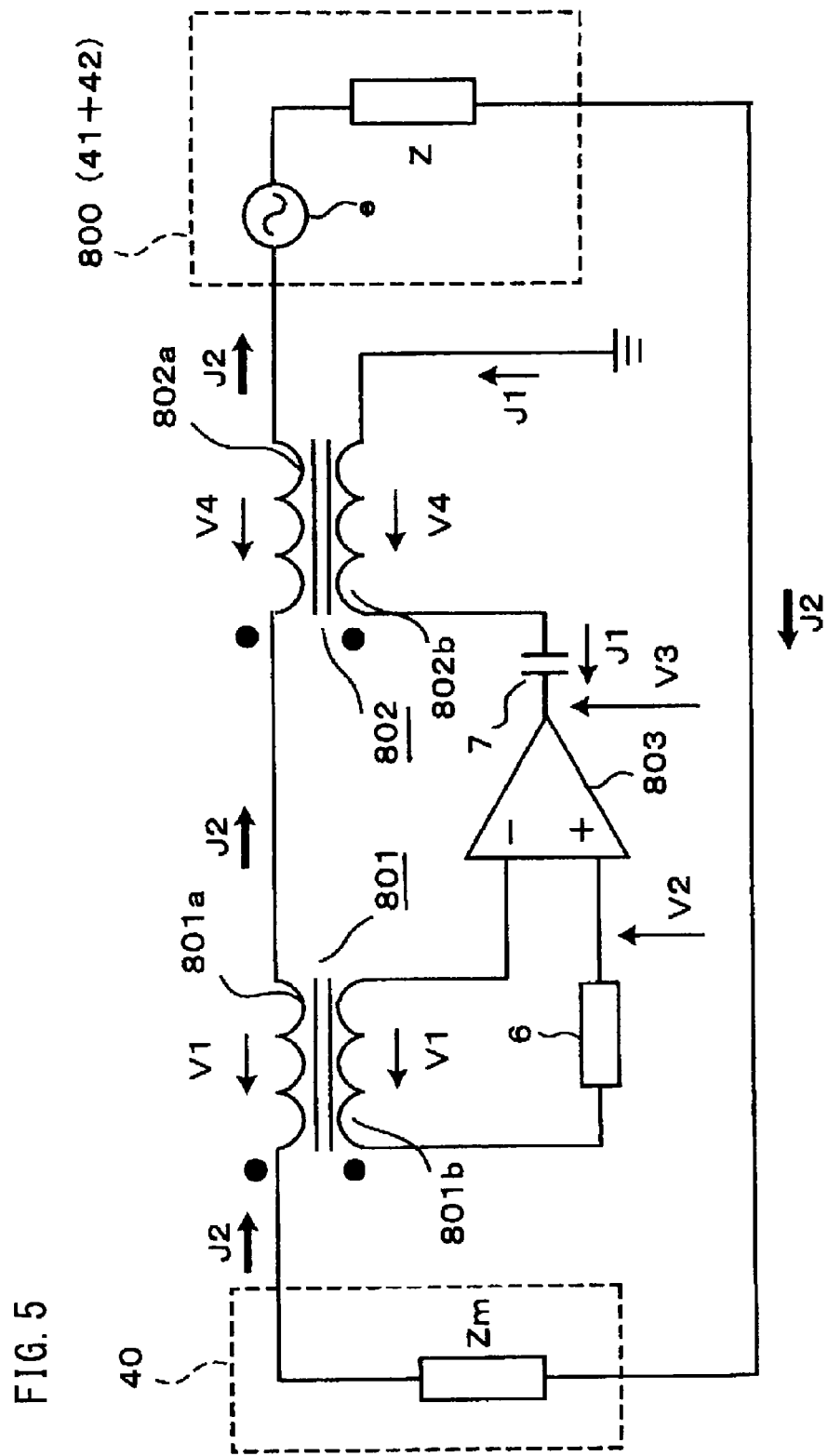
FIG. 5 is a circuit diagram showing an equivalent circuit of the high-frequency leakage current reducing apparatus shown in FIG. 1.
Figure 6:
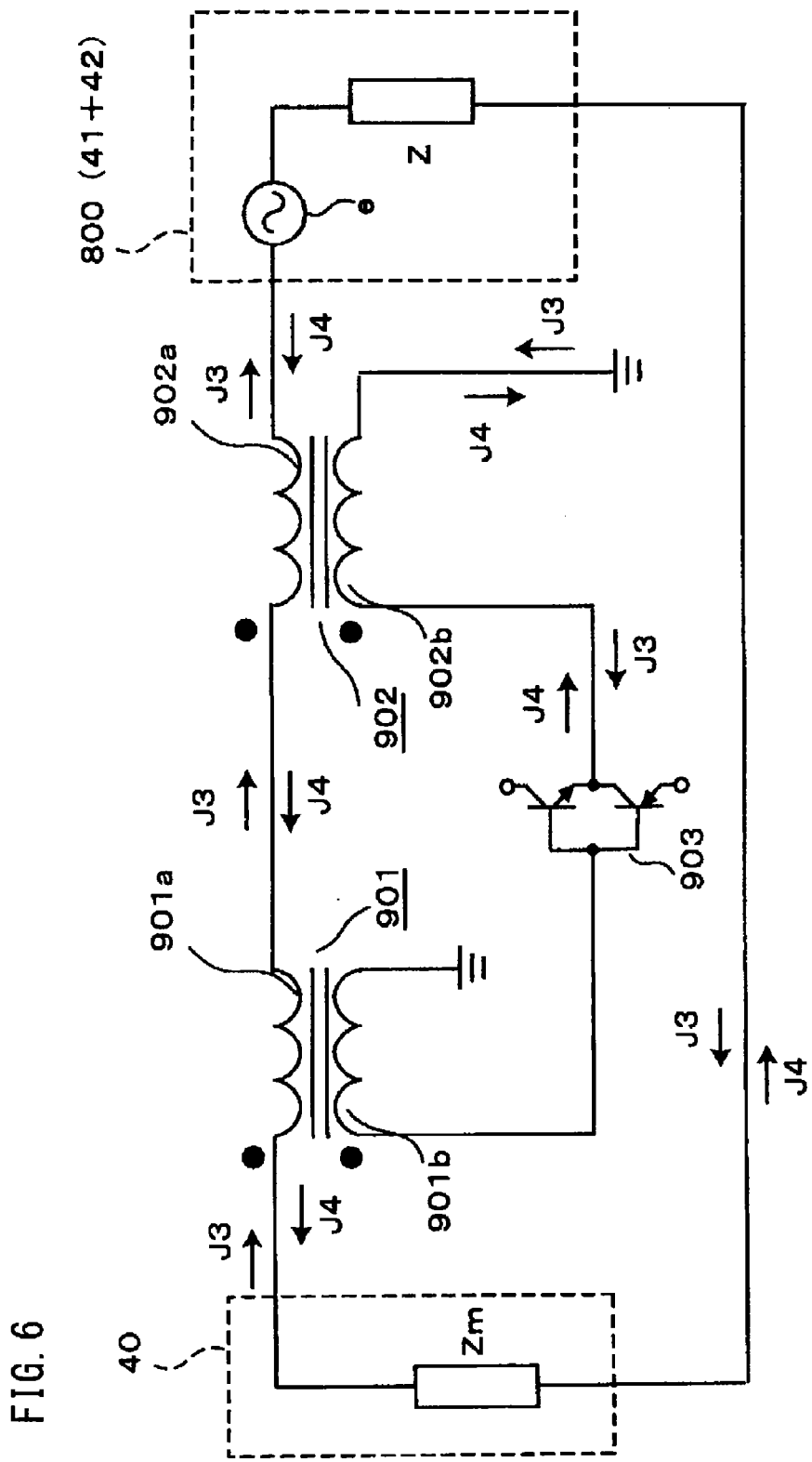
FIG. 6 is a circuit diagram showing an equivalent circuit of a conventional high-frequency leakage current reducing apparatus.

FIGS. 1 to 6 show embodiment 1 for carrying out the present invention. Specifically, FIG. 1 is a configuration diagram showing a high-frequency leakage current reducing apparatus. FIG. 2 is a connection diagram showing a connection example of the high-frequency leakage current reducing apparatus. FIG. 3 is a circuit diagram showing the detailed configuration of a converter. FIG. 4 is a circuit diagram showing the detailed configuration of an inverter. FIG. 5 is a circuit diagram showing an equivalent circuit of the high-frequency leakage current reducing apparatus shown in FIG. 1. FIG. 6 is a circuit diagram showing an equivalent circuit of a conventional high-frequency leakage current reducing apparatus. As shown in FIG. 1, a high-frequency leakage current reducing apparatus 100 as a leakage current reducing apparatus comprises a first common mode transformer 1, a second common mode transformer 2, and a voltage amplifier unit 3. The first common mode transformer 1 as voltage detection means comprises three-phase windings 11, 12, and 13 as main windings, and a winding 14 for common mode voltage detection as a winding for voltage detection. The windings 11, 12, and 13, and the winding 14 are each composed of a predetermined number of turns (in the present embodiment, five turns) of wire wound on an iron core not shown. It is noted that the windings 11 to 14 are wound so as to have polarities indicated by black filled circles drawn near these windings in FIG. 1.

The second common mode transformer 2 as voltage application means comprises three-phase windings 21, 22, and 23 as main windings, and a winding 24 for common mode voltage application as a winding for voltage application. The windings 21, 22, and 23, and the winding 24 are each composed of a predetermined number of turns (in the present embodiment, five turns) of wire wound on an iron core not shown. It is noted that the windings 21 to 24 are wound so as to have polarities indicated by black filled circles drawn near these windings in FIG. 1. The first common mode transformer 1 and the second common mode transformer 2 are connected to each other via three-phase connection lines 8r, 8s, and 8t. The voltage amplifier unit 3 is composed of an operational amplifier comprising: power supply terminals 3a and 3b for receiving supply of power for the operation of the voltage amplifier unit 3; and a transistor 3d for voltage amplification as a semiconductor device. The voltage amplifier unit 3 is supplied with the power for the operation from an external power supply not shown. An output from the winding 14 for common mode voltage detection is supplied to the positive terminal of the voltage amplifier unit 3 via a filter 6. The voltage of the supplied output is amplified by the transistor 3d, and then applied as an output voltage, to the winding 24 for common mode voltage application, via a capacitor 7 as an output-side filter. In addition, one terminal of the winding 14 for common mode voltage detection is grounded. It is noted that a resistor 9a is connected between the negative terminal of the voltage amplifier unit 3 and the ground, and a resistor 9b is connected between the negative terminal and the output terminal of the voltage amplifier unit 3, whereby a gain (G) can be adjusted by the resistance ratio between the resistors 9a and 9b. The filter 6 is composed of a plurality of separate filters not shown each of which can be adjusted with respect to the pass frequency range thereof, the separate filters being connected in parallel or in series, or connected in series and parallel. If the constant of each separate filter is adjusted, the gain for each frequency can be adjusted. Although the gain adjustment for each frequency may be performed by the voltage amplifier unit 3 instead of such filters, in the present embodiment, the case where the filter 6 performs the gain adjustment will be described.

Regarding the high-frequency leakage current reducing apparatus 100 having the above configuration, as shown in FIG. 2, the first common mode transformer 1 of the high-frequency leakage current reducing apparatus 100 is connected to an AC power supply 40 as a first electric apparatus, via connection lines 91r, 91s, and 91t for three phases R, S, and T. In addition, the second common mode transformer 2 is connected to a converter 41 as a second electric apparatus, via connection lines 93r, 93s, and 93t for the three phases R, S, and T. The converter 41 performs open/close control for IGBTs 41a (see FIG. 3 for details) as switching devices and semiconductor devices, which are connected in a three-phase full bridge fashion, thereby converting three-phase AC power to variable-voltage DC power. An inverter 42 is connected to the converter 41 via connection lines 49P and 49N. Variable-frequency and variable-voltage three-phase AC power is supplied from the inverter 42 to a three-phase motor 43 as a load, via connection lines 95r, 95s, and 95t. The inverter 42 performs open/close control for IGBTs 42a (see FIG. 4 for details) as switching devices and semiconductor devices, which are connected in a three-phase full bridge fashion, by using a PWM signal generated by comparison in magnitude between a phase voltage instruction, and a carrier having a predetermined frequency, which is a triangular wave or a saw-tooth wave. Thus, the inverter 42 converts DC power to variable-frequency and variable-voltage AC power. It is noted that, as is known in the art, frames or housings not shown of the AC power supply 40, the converter 41, the inverter 42, the three-phase motor 43, the first common mode transformer 1, and the second common mode transformer 2, are grounded (GND, earth), so that a leakage current flows via a ground floating capacitance.

Next, the operation will be described. The first common mode transformer 1, by using the winding 14 for common mode voltage detection, detects a common mode voltage V1 generated by common mode currents which are high-frequency leakage currents flowing in the connection lines 91r, 91s, and 91t for three phases, i.e., the windings 11, 12, and 13. In general, the frequency band of the high-frequency leakage current is 150 kHz to 30 MHz. However, the present invention is not limited thereto. The common mode voltage V1 is inputted to the voltage amplifier unit 3 via the filter 6, whereby the common mode voltage V1 is amplified by a factor of the gain (G) and then is outputted as the output voltage V3. The gain (G) is determined by the resistance ratio between the resistors 9a and 9b. The filter 6, which is composed of a plurality of separate filters, is set, for example, to decrease the gains of detection values for frequencies equal to or lower than the carrier frequency of the inverter, frequencies out of a range defined by a standard, and frequencies at which the voltage amplifier unit 3 resonates owing to the impedance of a system, or to increase the gain for a frequency that is a reduction target, thus adjusting the gain and the phase for each frequency. The DC component of the output voltage V3 is eliminated through the capacitor 7, and the resultant voltage is applied, as a voltage V4, to the winding 24 for common mode voltage application of the second common mode transformer 2, such that the phase of the voltage V4 substantially coincides with the phase of the common mode voltage V1. Thus, the voltage V4 as an application voltage whose phase substantially coincides with the phase of the common mode voltage V1 which operates as an inductance with respect to the high-frequency leakage currents, is applied to the windings 21, 22, and 23 for the three phases R, S, and T, that is, a voltage is generated on the windings 21, 22, and 23.

That is, in the first common mode transformer 1, the common mode voltage V1 generated by the common mode currents is detected. The gain for each frequency of the voltage V1 is adjusted by the filter 6, and the adjusted voltage is outputted as the voltage V2. The voltage V2 is amplified by a factor of G by the voltage amplifier unit 3, and the amplified voltage is outputted as the output voltage V3 from the voltage amplifier unit 3. The DC component of the output voltage V3 is eliminated through the capacitor 7, and the AC component is outputted as the voltage V4 from the capacitor 7. The voltage V4 is applied to the winding 24 of the second common mode transformer 2 such that the phase of the voltage V4 substantially coincides with the phase of the common mode voltage V1. Thus, the common mode currents flowing in the windings 11, 12, and 13 are supplied from the voltage amplifier unit 3 by using the common mode transformer 2. If the common mode currents are supplied by the common mode transformer 2, the common mode currents supplied from windings for the three phases R, S, and T are decreased, whereby the voltage value V1 detected by the common mode transformer 1 is decreased. Thus, the common mode current can be prevented from being supplied more than necessary from the voltage amplifier unit 3. Therefore, the limit of the gain of the voltage amplifier unit 3 can be set to be equal to or larger than a factor of 1, by adjustment of the constant of the above filter.

FIG. 5 shows the equivalent circuit of the high-frequency leakage current reducing apparatus 100 connected as shown in FIG. 2. In FIG. 5, the converter 41 and the inverter 42 in FIG. 2 are a noise generation source, and are collectively represented by a noise voltage source 800 whose noise voltage is e. The common mode impedance of the noise voltage source 800 is Z, and the common mode impedance of the AC power supply 40 is Zm. The equivalent circuit of the first common mode transformer 1 is represented by a transformer circuit 801 composed of a primary winding 801a and a secondary winding 801b (the turns ratio is 1:1).

The equivalent circuit of the second common mode transformer 2 is represented by a transformer circuit 802 composed of a primary winding 802a and a secondary winding 802b (the turns ratio is 1:1). The equivalent circuit of the voltage amplifier unit 3 is represented by an amplifier circuit 803. The amplifier circuit 803 is connected to the secondary winding 801b (the winding 14 for common mode voltage detection) of the transformer circuit 801. Since the input impedance of the amplifier circuit 803 is large, only a slight current flows in the secondary winding 801b. Therefore, in the primary winding 801a of the transformer circuit 801, the voltage V1 is generated by a common mode current J2. In addition, between both ends of the secondary winding 802b (winding 24) of the transformer circuit 802, the voltage V3 amplified by a factor of the gain G by the amplifier circuit 803 is applied to the secondary winding 802b via the capacitor 7. Therefore, the common mode current J2 is suppressed by the voltage V4 generated between both ends of the primary winding 802a of the transformer circuit 802.

On the other hand, FIG. 6 shows the equivalent circuit of the conventional leakage current reducing apparatus. A transformer circuit 901 for detecting a current, a transformer circuit 902 for injecting a current, and a current amplifier circuit 903 composed of transistors as current injecting sources, are connected as shown in FIG. 6. The transformer circuit 901 is composed of a primary winding 901a and a secondary winding 901b. The transformer circuit 902 is composed of a primary winding 902a and a secondary winding 902b. The current amplifier circuit 903 is connected to the secondary winding 901b of the transformer circuit 901. The current amplifier circuit 903 amplifies a common mode current J3 detected by the transformer circuit 901, by a factor of k, and outputs a current J4 (=J3×k). The current J4 flows in the primary winding 902a which is a main winding of the transformer circuit 902. Here, if k=1 is assumed, the common mode currents are cancelled by each other on any of the lines in FIG. 6. Thus, the common mode current J3 is suppressed. However, actually, the condition of k=1 is not satisfied owing to variations in the components, temperature change, or the like. As a result, there is a problem that the noise reduction effect cannot be sufficiently obtained.

However, according to the present embodiment, since the inductance between both ends of each of the windings 21, 22, and 23 of the second common mode transformer 2 is increased, the common mode currents flowing in the three-phase windings 21, 22, and 23 can be suppressed. In addition, since a simple amplifier circuit composed of an operational amplifier, for example, can be applied to the voltage amplifier unit 3, the configuration of the voltage amplifier unit 3 can be simplified.

Since the common mode voltage is generated on each of the three-phase windings 21, 22, and 23 as described above, this is equivalent to that the inductance in the first common mode transformer 1 that has been adjusted for each frequency by the filter 6 and amplified by a factor of G by the voltage amplifier unit 3 is generated between both ends of the second common mode transformer 2. The filter 6 is set to adjust the gain for each frequency by a combination of high-pass filters and low-pass filters, for example, thereby increasing the gain for a frequency band in which noise occurs at a large level. It is noted that the phase of the output voltage V4 applied to the winding 24 for common mode voltage application does not need to exactly coincide with the phase of the common mode voltage V1. That is, the phase of the output voltage V4 only needs to be within a range that does not impair the object of the present invention, that is, to be substantially the same as the phase of the common mode voltage V1.

Thus, at frequencies selected by the filter 6 and the capacitor 7, the inductance between both ends of each of the windings 21, 22, and 23 of the second common mode transformer 2 is increased. Therefore, the common mode currents flowing in the three-phase windings 21, 22, and 23 can be suppressed. In addition, a simple amplifier circuit composed of an operational amplifier, for example, can be applied to the voltage amplifier unit 3. Therefore, the configuration of the voltage amplifier unit 3 can be simplified. Moreover, since a transformer (common mode transformer) is used for noise detection, the filter 6 and the voltage amplifier unit 3 can be insulated from the connection lines 91r, 91s, and 91t and the connection lines 93r, 93s, and 93t on the main circuit side, and only a noise component can be detected through the filter 6. Therefore, since the electronic components used for the filter 6 and the voltage amplifier unit 3 do not need to have high breakage voltages, the size and the cost of the apparatus can be reduced.

It is noted that depending on the condition of noise occurrence, the circuit configuration using only the capacitor 7 or only the filter 6 may be employed.

In addition, regarding the detection of the common mode voltage V1 by the first common mode transformer 1, the input impedance of the voltage amplifier unit 3 is set at a large value so as to accurately detect the voltage between both ends of the winding 14. This is because decrease in the input impedance deteriorates the accuracy in detection of the common mode voltage V1. On the other hand, in the conventional technique, since the common mode current needs to be detected, it is necessary to flow a current by setting the input impedance at a relatively small value. Therefore, in the conventional technique, the common mode voltage generated in the transformer for current detection (coil for current detection) is substantially short-circuited on the output side of the winding (corresponding to the winding 14 in FIG. 1). Therefore, the common mode impedance hardly occurs. On the other hand, in the present embodiment, while the common mode voltage is generated, the generated common mode voltage is detected by the first common mode transformer 1. Therefore, noise reduction effect due to the common mode impedance generated by the first common mode transformer 1 is added, whereby further increased noise reduction effect is provided.

In addition, a phenomenon of the voltage amplifier unit 3 amplifying noise occurs at a frequency at which, owing to characteristics such as the impedance of the circuit to which the voltage amplifier unit 3 is connected and the delay time of the operational amplifier not shown stored in the voltage amplifier unit 3, the phase of the output voltage V3 of the operational amplifier inverts from the phase of the detected common mode voltage V1, or at a resonance frequency with the lines. Moreover, in the case where an inverter is connected (see, for details, a high-frequency leakage current reducing apparatus 300 and the inverter 42 in FIG. 8 of embodiment 3 described later), noise in a low frequency region such as the vicinity of the carrier frequency of the inverter, which does not need to be eliminated, is included. Therefore, the gains for such frequency bands as described above are decreased by the previously-described filter, whereby only noise in a frequency band that is a reduction target can be reduced without amplifying the above noise.

In addition, the frequency at which the phase inverts can be adjusted by adjustment of the constant of the filter 6. Therefore, it is possible to adjust the frequency at which the phase of the output voltage V4 (which is a voltage applied to the winding 24 of the second common mode transformer) outputted from the voltage amplifier unit 3 inverts from the phase of the common mode voltage V1 owing to characteristics such as the delay time of the operational amplifier or the like. Thus, since some tolerance is obtained with respect to the gain for the frequency at which the phase inverts, the gain of the operational amplifier for noise in a frequency band that is a reduction target can be set at a large value, whereby stable operation can be performed. The constant of the filter is adjusted so as to select, as the above frequency band that is a reduction target, a frequency band equal to or higher than 150 kHz which is defined by the noise standard, or a frequency band that indicates a large level of noise component as a result of measurement of noise of a system or a bus, for example. Thus, noise due to leakage currents in such frequency bands can be effectively reduced.

In addition, in the case where a DC component due to the offset occurs in the output voltage V3 of the operational amplifier of the voltage amplifier unit 3, if the output of the operational amplifier is directly applied to the second common mode transformer 2, a load connected to the operational amplifier is only the resistance of the winding in the second common mode transformer 2, and therefore a substantially short-circuited state occurs. As a result, normal operation cannot be performed, or extra control power is needed. However, in the present embodiment, since the output voltage V2 of the operational amplifier is inputted to the second common mode transformer 2 via the capacitor 7, a DC current due to the offset voltage or the like is interrupted by the capacitor 7. Therefore, the overcurrent operation of the operational amplifier can be prevented, and normal operation can be performed.

Recently, wide bandgap semiconductors, e.g., silicon carbide (SiC), gallium-nitride-based materials, or diamond, are used for switching devices such as the FETs 41a of the converter 41 and the IGBTs 42a of the inverter 42. As a result, the speed of switching operation is further increasing, but noise is also increasing along with the increase in the speed. In spite of such a problem as described above, the high-frequency leakage current reducing apparatus of the present embodiment can perform operation so as to reduce a high-frequency leakage current to suppress the occurrence of noise without selecting the types of switching devices. Therefore, it is possible to effectively reduce noise caused by switching devices, formed by silicon carbide or the like, that perform high-speed switching operation. In addition, similarly, even in the case where the voltage amplifier unit 3 performs amplification by using a semiconductor device such as the FET 3d formed by a wide bandgap semiconductor such as silicon carbide (SiC), gallium-nitride-based materials, or diamond, it is possible to reduce the influence of occurrence of noise and reduce the high-frequency leakage current.

It is noted that, as shown in FIG. 2, if the high-frequency leakage current reducing apparatus 100 is provided between the AC power supply 40 and the converter 41, all common mode currents generated by the converter 41 and the inverter 42 are to be suppressed. Therefore, noise propagation to the AC power supply 40 can be effectively suppressed.

Embodiment 2

Figure 7:
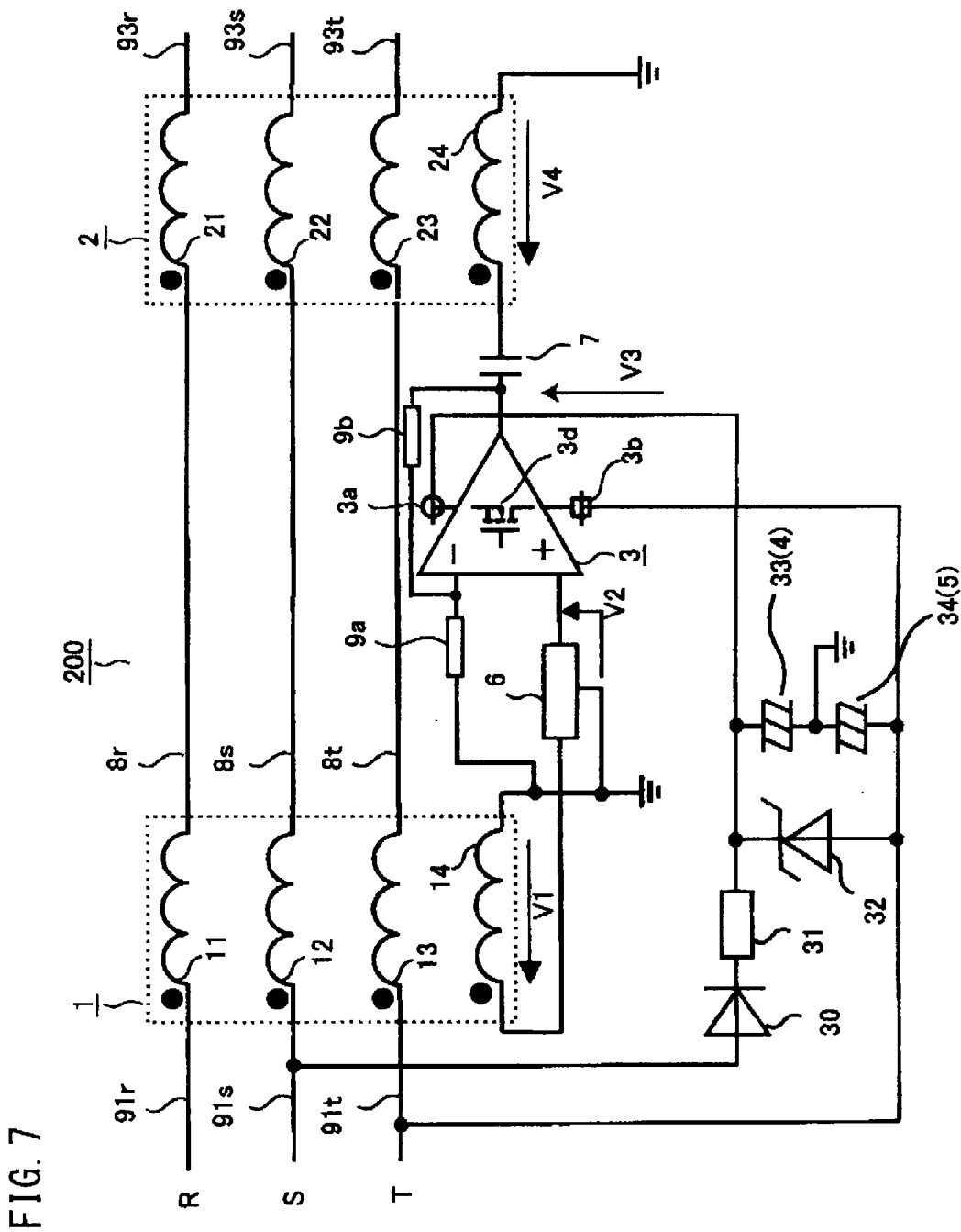
FIG. 7 is a configuration diagram showing a high-frequency leakage current reducing apparatus according to embodiment 2.

FIG. 7 is a configuration diagram showing the configuration of a high-frequency leakage current reducing apparatus according to embodiment 2. In FIG. 7, a high-frequency leakage current reducing apparatus 200 as a leakage current reducing apparatus is used in place of the high-frequency leakage current reducing apparatus 100 shown in FIG. 2. Power for the operation (power supply) of the voltage amplifier unit 3 is supplied from the connection lines 91s and 91t. In the high-frequency leakage current reducing apparatus 200, the anode of the diode 30 is connected to the connection line 91s for the phase S, and the cathode is connected via a resistor 31 to a capacitor 33 side of a series circuit composed of capacitors 33 and 34. The capacitor 34 side of the series circuit composed of the capacitors 33 and 34 is connected to the connection line 91t for the phase T. The connection point between the capacitors 33 and 34 is grounded. In addition, a zener diode 32 is connected in parallel with the series circuit composed of the capacitors 33 and 34.

An AC voltage occurs between the connection lines 91s and 91t for the phases S and T. The AC voltage is processed through half-wave rectification by the diode 30, and then divided by the resistor 31 and the zener diode 32, whereby power supplies 4 and 5 for driving the voltage amplifier unit 3 are obtained at the capacitors 33 and 34. It is noted that the power supplies 4 and 5 are connected to the power supply terminals 3a and 3b of the voltage amplifier unit 3. The other configuration is the same as that of embodiment 1 shown in FIGS. 1 to 4. Therefore, the components corresponding to those of embodiment 1 are denoted by the same reference numerals and characters, and the description thereof is omitted.

Thus, according to the present embodiment, the DC power supplies 4 and 5 for driving the voltage amplifier unit 3 can be supplied from the AC power supply side. Therefore, it is not necessary to provide an insulation transformer or a flyback converter. As a result, the size and the cost of a unit of the power supply can be reduced.

In FIG. 7, the DC power supplies 4 and 5 for driving the voltage amplifier unit 3 are obtained from the AC power supply 40 (see FIG. 2) via the connection lines 91s and 91t. However, DC power supplies may be obtained, through rectification, from the connection lines 8r, 8s, and 8t, or a series circuit composed of two capacitors as described above may be connected between the connection lines 49P and 49N shown in FIG. 2, to obtain DC power supplies. Also in such cases, the same effect can be provided.

Embodiment 3

Figure 8:
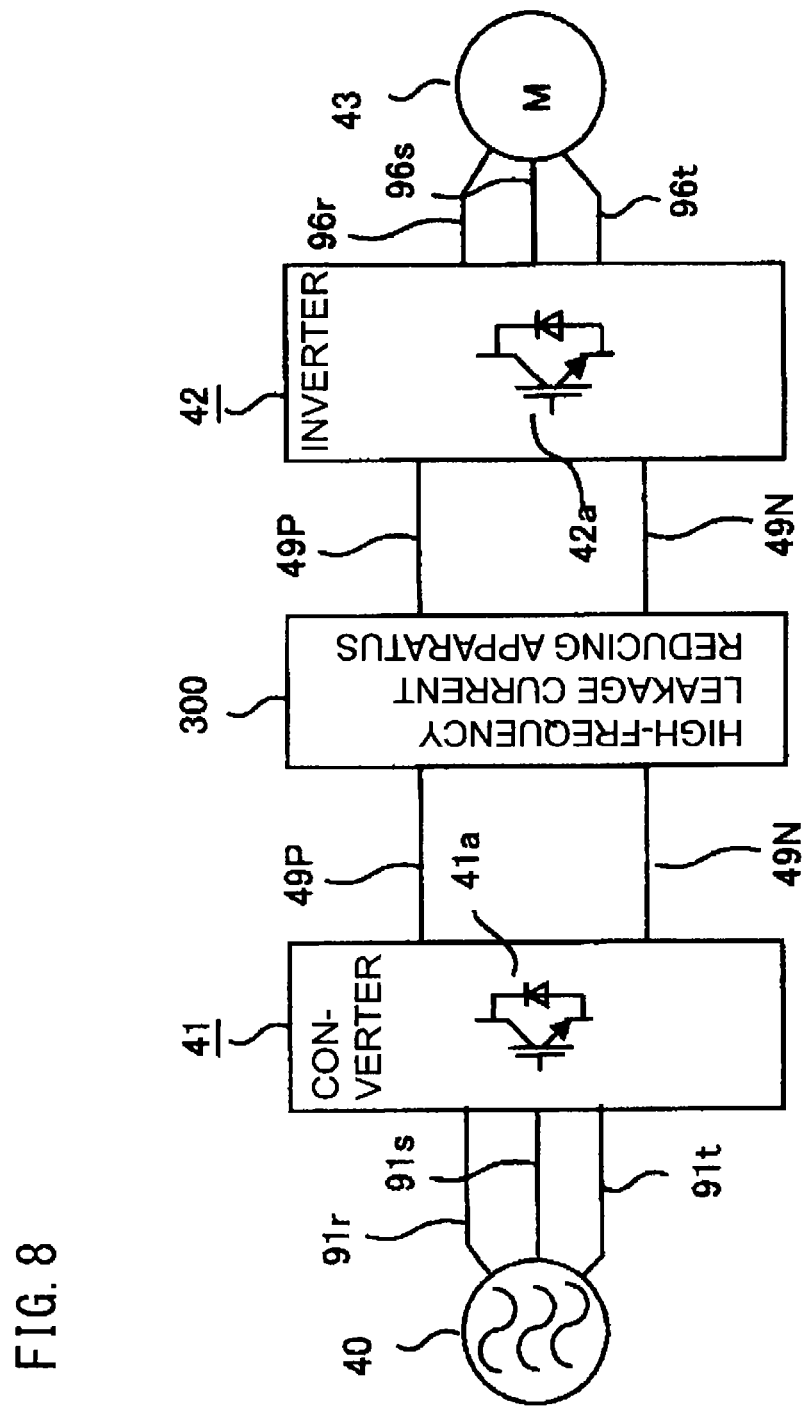
FIG. 8 is a connection diagram showing another connection example of a high-frequency leakage current reducing apparatus according to embodiment 3.
Figure 9:
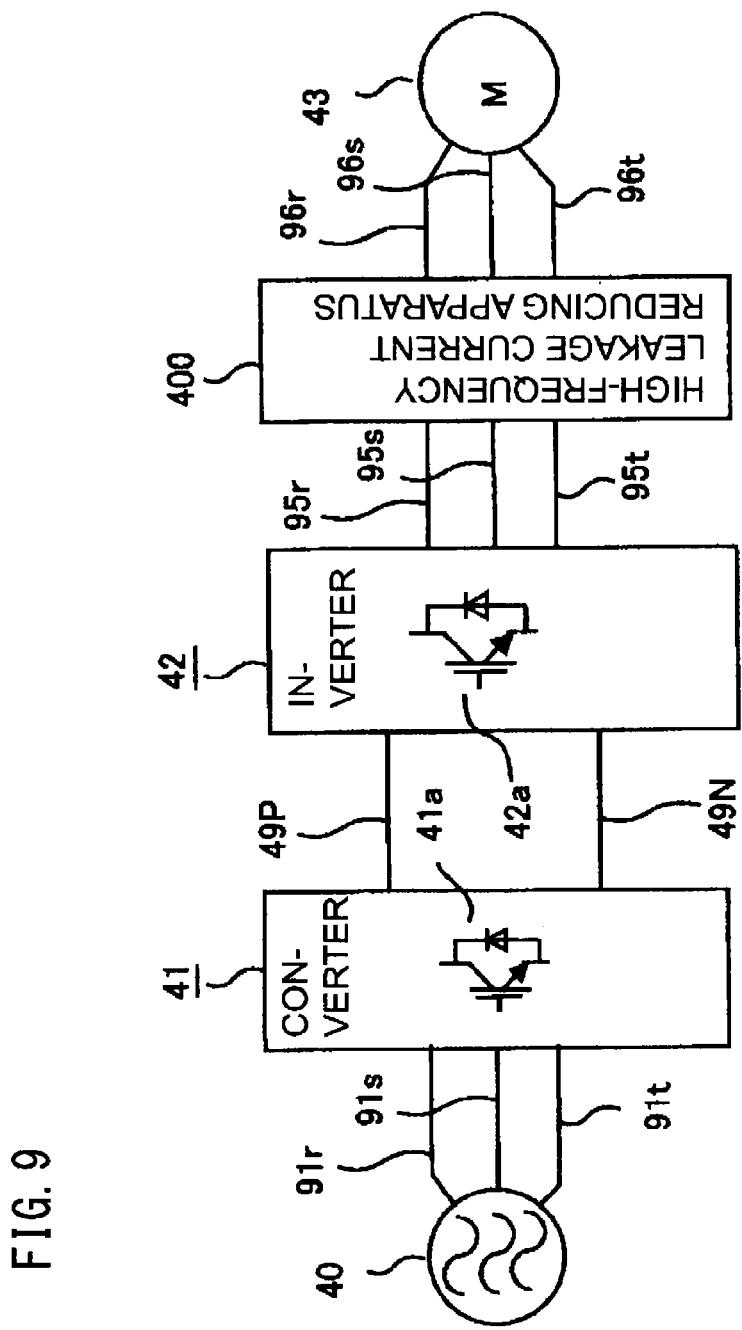
FIG. 9 is a connection diagram showing still another connection example of the high-frequency leakage current reducing apparatus according to embodiment 3.

FIGS. 8 and 9 show embodiment 3. Specifically, FIG. 8 is a connection diagram showing another connection example of the high-frequency leakage current reducing apparatus, and FIG. 9 is a connection diagram showing still another connection example. As shown in FIG. 8, the converter 41 as a first electric apparatus is connected to the AC power supply 40, and a high-frequency leakage current reducing apparatus 300 as a leakage current reducing apparatus is provided between the converter 41 and the inverter 42 as a second electric apparatus. The AC output side of the inverter 42 is connected to the three-phase motor 43, whereby the three-phase motor 43 is driven by variable-voltage and variable-frequency three-phase AC power. Since the high-frequency leakage current reducing apparatus 300 is provided on the DC side, the configuration thereof is slightly different from that of the high-frequency leakage current reducing apparatus 100 provided on the AC side shown in FIG. 1, in that, for example, only two main windings in which the DC currents flow are provided. However, the high-frequency leakage current reducing apparatus 300 has the same function as the high-frequency leakage current reducing apparatus 100 shown in FIG. 1.

In the case where the inverter 42 is connected as described above, noise in a low frequency region such as the vicinity of the carrier frequency of the inverter 42, which does not need to be eliminated, is included. Therefore, the gain for the above frequency band is decreased by the filter 6, whereby only noise in a frequency band that is a reduction target can be reduced without amplifying the above noise. In addition, in the case where the high-frequency leakage current reducing apparatus is provided between the converter 41 and the inverter 42 as described above, since only two connection lines (positive line 49P and negative line 49N) are present, the number of windings of each of the first common mode transformer 1 and the second common mode transformer 2 can be decreased by one. Therefore, the size and the cost of the high-frequency leakage current reducing apparatus can be further reduced.

Alternatively, as shown in FIG. 9, a high-frequency leakage current reducing apparatus 400 as a leakage current reducing apparatus may be provided between the inverter 42 as a first electric apparatus and the three-phase motor 43 as a second electric apparatus, and these units may be connected via the connection lines 95r, 95s, and 95t on the left side and connection lines 96r, 96s, and 96t on the right side of the high-frequency leakage current reducing apparatus 400 shown in FIG. 9. It is noted that the high-frequency leakage current reducing apparatus 400 has the same function as the high-frequency leakage current reducing apparatus 100 shown in FIG. 1 though there is a slight difference therebetween in their specifications.

In the high-frequency leakage current reducing apparatus 300 shown in FIG. 8, the DC power supplies for driving the voltage amplifier unit 3 may be obtained from the connection lines 49P and 49N on the converter 41 side or from the connection lines 49P and 49N on the inverter 42 side. In addition, in the high-frequency leakage current reducing apparatus 400 shown in FIG. 9, an AC voltage may be obtained from the connection lines 95r, 95s, and 95t or the connection lines 96r, 96s, and 96t, and then the AC voltage may be rectified to obtain DC power supplies, in the same manner as in the high-frequency leakage current reducing apparatus 300 shown in FIG. 8.

Embodiment 4

Figure 10:
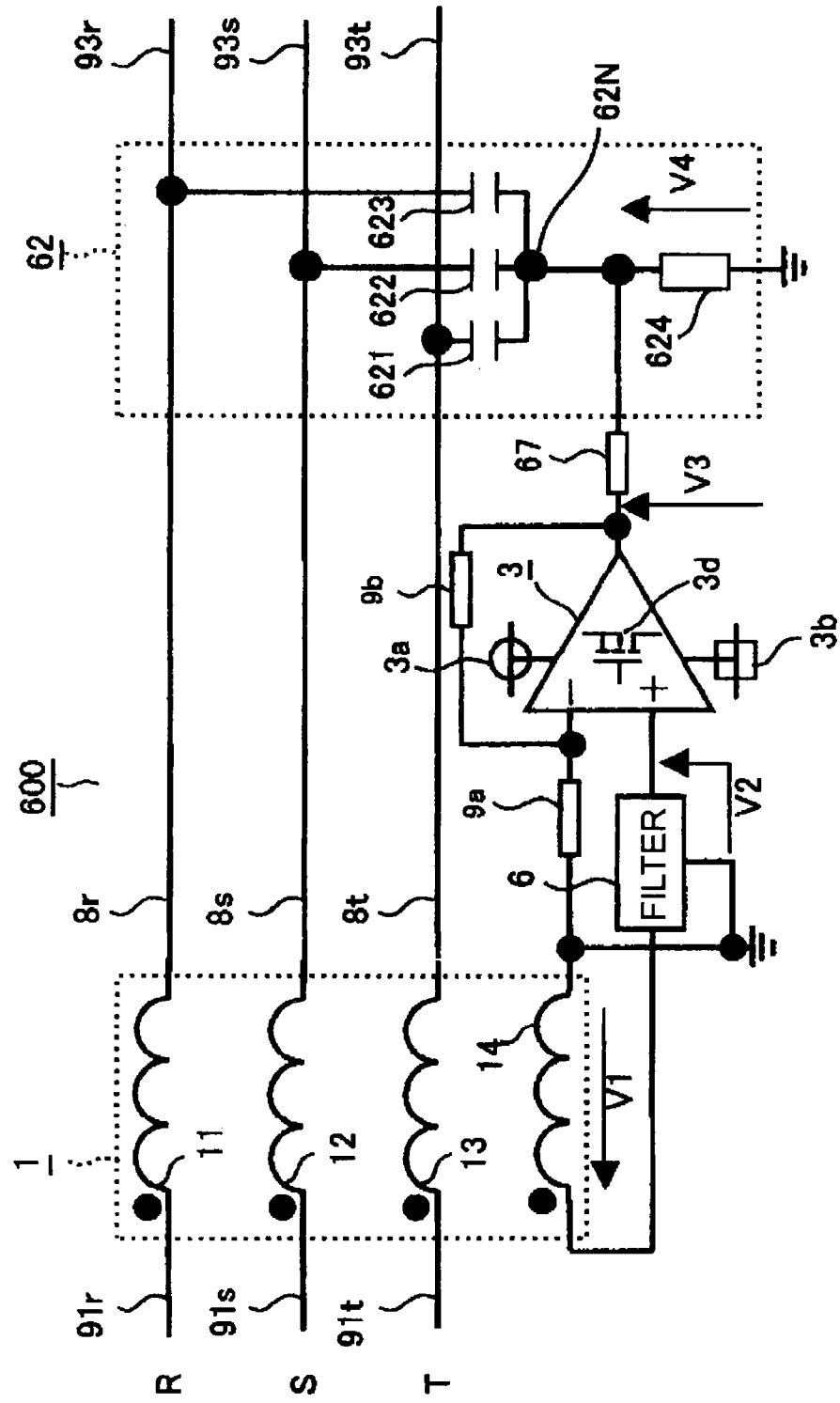
FIG. 10 is a configuration diagram showing a high-frequency leakage current reducing apparatus according to embodiment 4.

FIG. 10 is a configuration diagram of a high-frequency leakage current reducing apparatus according to embodiment 4. As shown in FIG. 10, a high-frequency leakage current reducing apparatus 600 comprises a voltage injection circuit 62 as voltage application means. The voltage injection circuit 62 is provided in place of the second common mode transformer 2 shown in FIG. 1. The voltage injection circuit 62 is composed of: capacitors 621, 622, and 623 for common mode voltage application as capacitors for voltage injection; and a ground resistor 624 as an impedance apparatus, which is connected to the capacitors 621, 622, and 623. Specifically, one of the pair of terminals of each of the capacitors 621, 622, and 623 is connected to the corresponding one of the three-phase connection lines 93r, 93s, and 93t, respectively, and the other one is commonly connected to a common connection point 62N as a neutral point in a Y-connection fashion. The common connection point 62N is grounded via the ground resistor 624. Providing the ground resistor 624 stabilizes the potential of the common connection point 62N to which the capacitors 621, 622, and 623 are connected in a Y-connection fashion for influences of normal mode noise and the like. In addition, a high-pass filter may be formed by a capacitor not shown of a filter 67, and the ground resistor 624, whereby injection of a voltage having a frequency equal to or lower than a standard frequency can be prevented.

The output of the winding 14 for common mode voltage detection is supplied to the positive input terminal of the voltage amplifier unit 3 via the filter 6, and the supplied voltage is amplified by the FET 3d. Then, the amplified voltage is applied as an output voltage, via the filter 67 as an output-side filter, to the connection point between the ground resistor 624 and the common connection point 62N among the capacitors 621, 622, and 623. The other configuration is the same as that of embodiment 1 shown in FIG. 1. Therefore, the components corresponding to those of embodiment 1 are denoted by the same reference numerals and characters, and the description thereof is omitted.

By adjustment of the gain for each frequency in the filter 6, a phase inverting frequency can be adjusted at which the phase of the output voltage V3 of the operational amplifier not shown stored in the voltage amplifier unit 3 inverts from the phase of the common mode voltage V1 detected by the common mode transformer 1. Therefore, it is possible to adjust the frequency at which the output phase of the voltage amplifier unit 3 inverts owing to characteristics such as the delay time of the operational amplifier or the like. Thus, since some tolerance is obtained with respect to the gain of the operational amplifier for the frequency at which the phase inverts, the gain of the operational amplifier for noise in a frequency band that is a reduction target can be set to be large.

In addition, in the three-phase power supply system as a noise reduction target, if one of the three phases is grounded, the voltage corresponding to the one phase of the three-phase power supply system might be applied to the output of the voltage amplifier unit 3. Such a voltage adversely affects the operation of the voltage amplifier unit 3. Therefore, the filter 67 is connected to the output side of the voltage amplifier unit 3, thereby preventing the voltage of the one phase of the power supply system from being applied through the voltage injection circuit 62. It is noted that the filter 67 is composed of a capacitor and a resistor to form a high-pass filter. If the output impedance of the voltage amplifier unit 3 can substitute for the resistor of the filter 67, the filter 67 is composed of only the capacitor.

As a variation of the voltage injection circuit 62, a capacitor as an impedance may be provided in place of the ground resistor 624. A phenomenon of the voltage amplifier unit 3 outputting an abnormal voltage occurs at a phase inverting frequency at which, owing to characteristics such as the impedance of the circuit to which the voltage amplifier unit 3 is connected and the delay time of the operational amplifier not shown stored in the voltage amplifier unit 3, the phase of the output voltage V3 of the operational amplifier of the voltage amplifier unit 3 inverts from the phase of the common mode voltage V1 detected by the common mode transformer 1, or at a resonance frequency with the lines. However, the phase inverting frequency and the resonance frequency can be adjusted by adjustment of the capacitances of the capacitors 621, 622, and 623. Thus, the frequencies at which such an abnormal voltage as described above is outputted can be separated from a frequency that is a reduction target, defined by a noise standard.

As described above, in the high-frequency leakage current reducing apparatus 600 as a leakage current reducing apparatus according to the present embodiment, the voltage injection circuit 62 as voltage application means comprises the plurality of capacitors 621 to 623 as voltage injection capacitors each of which has a pair of terminals. One of the pair of terminals of each of the capacitors 621 to 623 is connected to the corresponding one of the plurality of the connection lines 93r, 93s, and 93t, respectively, and the other one is commonly connected to the common connection point 62N. The common connection point 62N is grounded via the ground resistor 624 as an impedance apparatus. The voltage V4 which is the output from the voltage amplifier unit 3 is applied between the common connection point 62N and the ground, whereby an application voltage whose phase substantially coincides with the phase of the detected voltage is generated on the connection lines.

In the above embodiments, the windings 11, 12, and 13 and the winding 14 of the first common mode transformer 1 are each composed of the same number of turns of wire, i.e., five turns of wire wound on an iron core not shown. In addition, the windings 21, 22, and 23, and the winding 24 for common voltage application as a winding for voltage application of the second common mode transformer 2, are each composed of the same number of turns of wire, i.e., five turns of wire wound on an iron core not shown. However, the present invention is not limited thereto. The number of turns of the winding 14 for common mode voltage detection may be N times as large as the number of turns of the windings 11, 12, and 13 (where N is an integer equal to or larger than 2). In this case, the detection value of the common mode voltage is V1×N.

Thus, if the detection value of the common mode voltage is increased N times, that is, if the number of turns of the winding 14 for common mode voltage detection is set to be larger than the number of turns of the windings 11, 12, and 13 to increase the detected voltage, an inductance that is N×G (G is gain) times as large as the inductance in the first common mode transformer 1 is applied to the winding 24 of the second common mode transformer 2. Therefore, the common mode currents flowing in the connection lines 91r to 91t and the windings 21, 22, and 23 can be further suppressed. In addition, in the case where the turns ratio N is set at a large value, the gain G of the voltage amplifier unit 3 may be set at a relatively small value, whereby occurrence of gain error or offset error in the voltage amplifier unit 3 can be suppressed. In addition, even in the case where the first common mode transformer 1 having a decreased size and a decreased impedance is used, if the turns ratio N is set at a large value, a sufficiently large common mode voltage can be detected. In addition, since the winding 24 is directed to detection of the common mode voltage, and a current flowing therein is not very large, a thin wire can be used. Therefore, it is relatively easy to set the turns ratio N at a large value.

In addition, in the first common mode transformer 1, the number of turns of each of the windings 11, 12, and 13 may be N times as large as the number of turns of the winding 14 for common mode voltage detection (where N is an integer equal to or larger than 2). In this case, since the number of turns of the winding 14 for common mode voltage detection is 1/N of the number of turns of each of the windings 11, 12, and 13, the detection value of the common mode voltage is V1/N. However, even if the number of turns of each of the windings 11, 12, and 13 of the first common mode transformer 1 is large, the number of turns of the winding 14 for common mode voltage detection can be set at a small value. Therefore, the effect of facilitating installation of the winding 14 is obtained. It is noted that although the detection value of the common mode voltage is V1/N, if the gain G of the voltage amplifier unit 3 is increased, a desired leakage current reduction effect can be obtained.

In the above embodiments, the windings 11 to 13, 14, 21 to 23, and 24 in the first and the second common mode transformers are each composed of wire wound on an iron core. However, the present invention is not limited thereto. For example, the connection lines 91r, 91s, and 91t may penetrate through ring-shaped iron cores, and wires may be wound on the ring-shaped iron cores to form the winding 14 for common mode voltage detection and the winding 24 for common mode voltage application. Also in this case, the same effect can be obtained.

In the filter 6, one filter or a plurality of separate filters may be used, the pass frequency characteristics of the separate filters may be able to be adjusted or may be fixed, and the separate filters may be used in combination as appropriate using parallel connection, series-parallel connection, and the like, thus enabling the filter 6 to have a desired characteristic.

In addition, the filter 67 as a second filter shown in FIG. 10 may be used in place of the capacitor 7 as the output-side filter shown in FIGS. 1 and 7. Moreover, the filter 6 may be omitted.

The invention claimed is:

1. A leakage current reducing apparatus comprising:
    voltage detection means; an input-side filter; a voltage amplifier unit; and voltage application means, the leakage current reducing apparatus being provided, via a connection line, between a first electric apparatus and a second electric apparatus, wherein
    the voltage detection means comprises a main winding, and a winding for leakage current detection,
    the main winding is provided, via the connection line, between the first electric apparatus and the second electric apparatus, so that a leakage current flowing in the connection line is detected, as a detected voltage, by the winding for leakage current detection,
    the detected voltage is inputted to the input-side filter, and the input-side filter outputs a detected signal by adjusting the amplitude and the phase of the detected voltage for each frequency,
    the voltage amplifier unit amplifies the detected signal from the input-side filter, and outputs the amplified signal as an output voltage,
    the voltage application means generates, on the connection line, an application voltage for reducing the leakage current, based on the output voltage, and
    the input-side filter reduces a frequency component in the detected signal at which the phase of the output voltage inverts from the phase of the detected voltage.

2. The leakage current reducing apparatus according to claim 1, wherein
    the voltage application means generates, on the connection line, the application voltage whose phase substantially coincides with the phase of the detected voltage, based on the output voltage.

3. The leakage current reducing apparatus according to claim 2, wherein
    the voltage application means comprises a main winding, and a winding for voltage application,
    the main winding of the voltage detection means and the main winding of the voltage application means are connected in series to each other, and provided between the first electric apparatus and the second electric apparatus via the connection line, and
    the output voltage is applied to the winding for voltage application, whereby the application voltage whose phase substantially coincides with the phase of the detected voltage is generated on the main winding of the voltage application means.

4. The leakage current reducing apparatus according to claim 3, further comprising an output-side filter, wherein
    in the voltage application means, the output voltage is applied to the winding for voltage application via the output-side filter.

5. The leakage current reducing apparatus according to claim 1, wherein
    the input-side filter can be adjusted with respect to the pass frequency range thereof.

6. The leakage current reducing apparatus according to claim 5, wherein
    the input-side filter can be adjusted with respect to the constant thereof, so that the frequency at which the phase of the output voltage inverts from the phase of the detected voltage can be adjusted by the constant being changed.

7. The leakage current reducing apparatus according to claim 1, wherein
    the input-side filter is composed of filters that can be adjusted with respect to the respective pass frequency ranges thereof, the filters being connected in parallel or in series, or connected in series and parallel in a multi-stage fashion.

8. The leakage current reducing apparatus according to claim 1, wherein
    one of the first electric apparatus and the second electric apparatus is an inverter of pulse width modulation type, and
    the input-side filter restricts passing of a frequency component, of frequency components of the detected voltage, that has a frequency equal to or lower than a carrier frequency of the inverter.

9. The leakage current reducing apparatus according to claim 1, wherein
    the first electric apparatus is an AC power supply, and
    the second electric apparatus is a converter that converts AC power outputted from the AC power supply, to DC power.

10. The leakage current reducing apparatus according to claim 1, wherein
    the first electric apparatus is a converter that converts AC power to DC power, and
    the second electric apparatus is an inverter that converts the DC power outputted from the converter, to AC power.

11. The leakage current reducing apparatus according to claim 1, wherein
    the first electric apparatus is an inverter that converts DC power to AC power, and
    the second electric apparatus is a load driven by the inverter.

12. The leakage current reducing apparatus according to claim 1, wherein
    the voltage amplifier unit reduces a frequency component in the output voltage at which the phase of the output voltage inverts from the phase of the detected voltage, and the frequency can be adjusted.

* * * * *